US008290247B2

(12) United States Patent
Slabaugh et al.

(10) Patent No.: US 8,290,247 B2
(45) Date of Patent: Oct. 16, 2012

(54) METHOD AND SYSTEM FOR SEGMENTATION OF TUBULAR STRUCTURES IN 3D IMAGES

(75) Inventors: Gregory G. Slabaugh, Princeton, NJ (US); Gozde Unal, Plainsboro, NJ (US); Tong Fang, Morganville, NJ (US); Brian Whited, Memphis, TN (US); Jaroslaw Rossignac, Atlanta, GA (US)

(73) Assignee: Siemens Aktiengesellschaft, Munich (DE)

( * ) Notice: Subject to any disclaimer, the term of this patent is extended or adjusted under 35 U.S.C. 154(b) by 1200 days.

(21) Appl. No.: 12/150,817

(22) Filed: May 1, 2008

(65) Prior Publication Data
US 2009/0016588 A1    Jan. 15, 2009

Related U.S. Application Data

(60) Provisional application No. 60/938,239, filed on May 16, 2007.

(51) Int. Cl.
    *G06K 9/00*    (2006.01)
(52) U.S. Cl. ........ 382/154; 382/131; 345/653; 345/664; 345/679; 378/4; 378/21; 701/152
(58) Field of Classification Search ........................ None
    See application file for complete search history.

(56) References Cited

U.S. PATENT DOCUMENTS

| 6,754,376 B1 | 6/2004 | Turek et al. |
| 7,116,810 B2 | 10/2006 | Miller et al. |
| 2002/0168110 A1* | 11/2002 | Al-Kofahi et al. ............ 382/199 |
| 2004/0101182 A1* | 5/2004 | Miller et al. .................. 382/131 |
| 2004/0114800 A1* | 6/2004 | Ponomarev et al. ........... 382/173 |
| 2005/0110791 A1* | 5/2005 | Krishnamoorthy et al. .. 345/419 |
| 2006/0159326 A1 | 7/2006 | Rasche et al. |
| 2006/0251304 A1 | 11/2006 | Florin et al. |
| 2007/0216678 A1* | 9/2007 | Rouet et al. .................. 345/423 |
| 2008/0187197 A1* | 8/2008 | Slabaugh et al. ............. 382/128 |
| 2009/0129671 A1* | 5/2009 | Hu et al. ....................... 382/173 |

FOREIGN PATENT DOCUMENTS

WO    2004/104939 A1    12/2004
WO    WO 2004104939 A1 *  12/2004

OTHER PUBLICATIONS

Li et al., "Vessels as 4D Curves: Global Minimal 4D Paths to Extract 3D Tubular Surfaces," Jun. 17-22, 2006, IEEE, pp. 82-89.*
Tyrrell et al., "Modeling of Vaculature Imagery Using Superellipsoids," Feb. 2007, IEEE pp. 223-237.*

(Continued)

*Primary Examiner* — John Lee (57) ABSTRACT

A method and system for segmenting tubular structures in 3D images is disclosed. User inputs identifying a first region on the image inside of a tubular structure and a second region of the image outside of the tubular structure are received. Based on this information, an ordered series of pearls are generated along the tubular structure. Pearls are spheres, each having a center location and a radius determined based on the center locations and radii of previous pearls and on local voxel intensities in the image. A continuous model of the tubular structure can be generated by interpolating the center locations and radii of the ordered series of pearls. The ordered series of pearls can be displayed and easily edited in response to user input, thus providing an efficient and flexible method for interactive segmentation of a potion of interest in a tubular structure.

25 Claims, 6 Drawing Sheets

OTHER PUBLICATIONS

C. Kirbas, et al., "A Review of Vessel Extraction Techniques and Algorithms", ACM Computing Surveys, 36(2), 2004, pp. 81-121.

J. A. Tyrrell, et al., "Modeling of Vasculature Imagery Using Superellipsoids", IEEE Transactions of Medical Imaging, 26(2), 2007, pp. 223-237.

P. Medek, et al., "Computation of Tunnels in Protein Molecules Using Delaunay Triangulation", Journal of WSCG, 2007.

Li et al "Vessels as 4D Curves: Global Minimal 4D Paths to Extract 3D Tubular Surfaces", IEEE; Conference on Computer Vision and Pattern Recognition Workshop, 2006, CVPRW '06; Jun. 17-22, 2006, pp. 82-89.

\* cited by examiner

METHOD AND SYSTEM FOR SEGMENTATION OF TUBULAR STRUCTURES IN 3D IMAGES

This application claims the benefit of U.S. Provisional Application No. 60/938,239, filed May 16, 2007, the disclosure of which is herein incorporated by reference.

BACKGROUND OF THE INVENTION

The present invention relates to image segmentation, and more particularly, to segmentation of tubular structures in 3D images.

Computed tomography (CT) and magnetic resonance imaging (MRI) scans are frequently used to support diagnosis and analysis of cardiovascular and pulmonary anatomic structures. Such structures can appear as tubular structures in CT and MR images. Accordingly, segmentation, or extraction, of 3D tubular structures from 3D image data is a fundamental problem in medical imaging, and is an important component of clinical applications involving diagnosis (e.g., stenosis, aneurysm, etc.), surgical planning, anatomical modeling and simulation, and treatment verification.

Using manual segmentation techniques to segment 3D tubular structures typically requires too much tedious labor to be practical in clinical applications. Various fully automatic segmentation methods have been developed for segmenting vessels and other tubular structures. However, due to poor contrast, noise, and clutter that is common to medical images, it is often difficult for fully automatic segmentation methods to yield robust results. Furthermore, one may be interested in extracting only a subset, for example a specific path through a branching network of tubular structures. Therefore, there is a salient need for an interactive segmentation method that is mostly automatic, but accepts input from an operator to guide the segmentation in a particular direction, quickly correct for errant segmentations, and add branches to an existing segmentation result. Computational efficiency is crucial to such a semi-automatic segmentation method, so that the operator will not have to wait for segmentation results while interacting with data. Typical conventional automatic segmentation techniques have runtimes that are too slow for use in such an interactive segmentation method.

BRIEF SUMMARY OF THE INVENTION

The present invention provides a method for segmenting tubular structures in 3D images. Embodiments of the present invention are directed to segmenting tubular structures in 3D images using a method referred to herein as pearling. Pearling generates an ordered series of pearls, which are 3D spheres of possibly different radii, as representation of a tubular structure. Pearling is robust to fluctuations in image intensities (due to noise, etc.) as the forces acting on a pearl are integrated over the region inside the pearl. Pearling is computationally efficient and well suited to user interactivity. Such interactivity can allow operator guidance of the segmentation in a particular direction, as well as operator correction of errant or undesired segmentation results.

In one embodiment of the present invention, user inputs identifying a first region on the image inside of a tubular structure and a second region of the image outside of the tubular structure are received. Based on the voxel intensities in the first and second regions, probability densities for inside and outside of the structure are estimated. An ordered series of pearls are generated along the structure. Pearls are 3D spheres, each having a center location and a radius determined based on local voxel intensities in the image. The probability densities are used to iteratively estimate the center point and the radius for each pearl. Once the ordered series of pearls has been established, a continuous model of the tubular structure is generated by interpolating the center locations and radii of the ordered series of pearls. The ordered series of pearls and the continuous model can be output and used in interactive segmentation. The ordered series of pearls or the continuous model is displayed and edited based on user inputs.

These and other advantages of the invention will be apparent to those of ordinary skill in the art by reference to the following detailed description and the accompanying drawings.

DETAILED DESCRIPTION

The present invention is directed to a method for segmenting tubular structures in 3D images. Embodiments of the present invention are described herein to give a visual understanding of the segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention are directed to segmenting tubular structures in 3D images using pearling. Pearling allows a user to guide the automated construction of a 3D model of a tubular structure directly from 3D volume data, without going through slice contours or relying on global segmentation. Pearling can significantly improve clinical workflow because it eliminates delays between user actions (e.g., that select which undesired branched should be trimmed or where new branches should be grown) and automatic updates of the resulting 3D model. The pearling method described herein provides the ability for a user to input endpoints, such that time is not wasted segmenting unwanted branches. Accordingly, a user can interactively construct an accurate model of a desired portion of a tubular structure.

Pearling outputs a high-level 3D model of a desired portion of a tubular structure in a 3D image. This 3D model is referred to herein as a tree (even though it is an oriented graph that may contain closed loops). The tree has a seed (root) and is divided into branches and bifurcations. Each bifurcation is a ball (sphere), and each branch is the region swept by a ball of varying radius and can be defined by a smooth four-dimensional piecewise parametric curve that specifies the spine (three-dimensional curve) and local thickness (radius variation along the spine).

Figure 1:
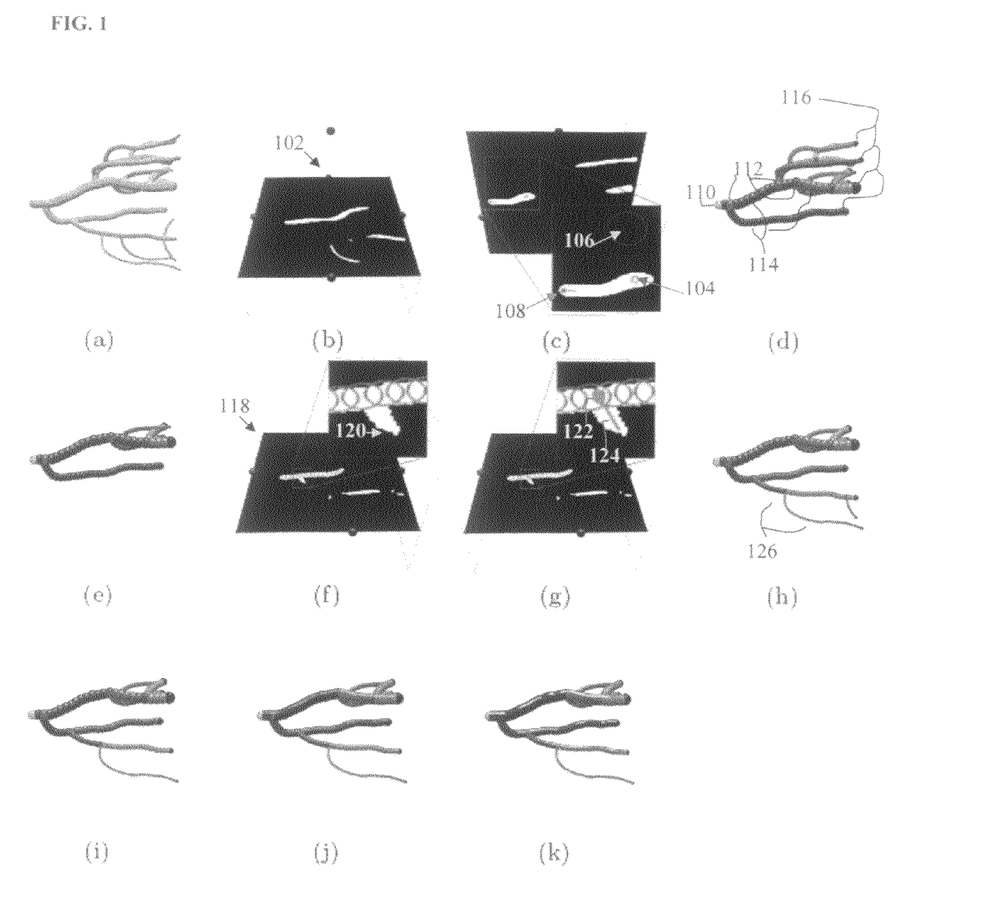
FIG. 1 is a series of images that illustrate the segmentation of a tubular structure in a 3D image volume using pearling.

FIG. 1 is a series of images that illustrate the segmentation of a tubular structure in a 3D image volume using pearling. As illustrated in FIG. 1, image (a) shows a segmentation of tubular structure obtained from a 3D volume using global thresholding. This tubular structure is the target structure that is segmented using pearling is images (b)-(k) of FIG. 1. The present invention is not limited a specific type of image and can be applied to segment tubular structures in any type of 3D images. Images (b)-(k) of FIG. 1 are described in greater detail below.

Figure 2:
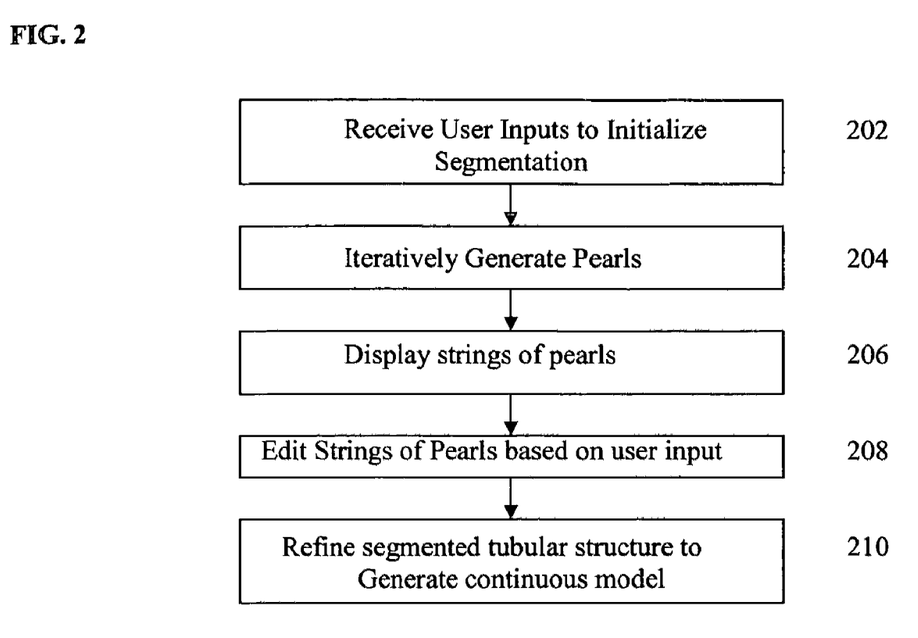
FIG. 2 illustrates a method of segmenting a tubular structure in a 3D image using pearling according to an embodiment of the present invention.

FIG. 2 illustrates a method of segmenting a tubular structure in a 3D image using pearling according to an embodiment of the present invention. At step 202, user inputs are received to initialize the segmentation method. A user may use an interactive viewer to explore the volume and to continuously slide or reorient a cross-section through the volume.

User inputs identifying a first region inside of the structure to be segmented and a second region outside of the structure to be segmented are received. The first and second regions can be identified by a user selecting, in a slice of the 3D volume, an area inside of the tubular structure and then selecting another area outside of the tubular structure. Image (b) of FIG. 1 illustrates a horizontal slice 102 through a volume displayed by an interactive viewer. Image (c) of FIG. 1 shows the selection of a first region 104 inside the tubular structure and a second region 106 outside of the tubular structure on a slice of the 3D volume. Based on the first and second regions, a classification function can be estimated that classifies voxels in the 3D image as inside or outside of the tubular structure. A spectrum of different classification functions and estimation methods may be used. For example, the intensities inside and outside of the structure can be characterized based on the first and second regions using non-parametric density estimation. The intensities in first and second regions are histogrammed, and a probability density for each region can be estimated by applying a smoothing kernel K to the region's histogram, i.e., $$\hat{p} = \frac{1}{n}\sum_{i=1}^{n} K\left(\frac{I_i - m}{h}\right), \quad (1)$$

where $I_i$ is the intensity of the $i^{th}$ voxel in the region, m is the mean of intensities of the n voxels in the region, and h is the bandwidth of the estimator. A Gaussian kernel, $$K(u) = \frac{1}{\sqrt{2\pi}} e^{-\frac{1}{2}u^2},$$

can be used. Performing this operation on the user input first and second regions results in first and second probability densities, $\hat{p}_{in}(I)$ and $\hat{p}_{out}(I)$, for the first region (inside the tubular structure) and the second region (outside the tubular structure), respectively.

In addition to the user inputs identifying the first and second regions, user inputs can be received identifying a seed point to begin the segmentation and a desired direction of the segmentation, in which the tree is to be grown. Image (c) of FIG. 1 shows user selection 108 on a slice of the 3D volume that indicates a seed point and desired direction. The user may also choose endpoints for the segmentation, which can be input as single points.

At step 204, pearls are iteratively generated along the tubular structure in the 3D image. This automatically grows the tree representing a portion of the tubular structure one branch at a time, identifying bifurcations and making local decisions automatically as to which branches to follow. As defined herein, a pearl is a 3D sphere having a radius and a center point. The radius of each pearl can be different, and the radius and center point of each pearl is determined based on local intensities inside that pearl and in its vicinity. According to an embodiment of the present invention, three global parameters can be used to control the process of generating the pearls: $T_h$, which controls a desired height of the tree, $r_{min}$, which is a minimum pearl radius, and $G_{target}$, which is a desired goodness measurement of each pearl (described in greater detail below). Because the effect of changing these parameters can be seen immediately in the pearl generation, these parameters can be adjusted easily for each application, or for each model.

An initial pearl, called seed, is generated based on an initial seed point. As described above, the initial seed point can be received as a user input. It is also possible that the initial seed point can be automatically determined. The branches of the tree connect the seed pearl to bifurcation pearls and leaf pearls. Furthermore, each branch can be made up of a (ordered set) of control pearls. A leaf pearl has one incident edge, and is the end of a branch. A control pearl has two incident edges, and connects pearls in a branch. A bifurcation pearl has three or more incident edges and occurs at a bifurcation in the tubular structure at which multiple branches intersect. The iterative pearl generation can automatically follow all branches at bifurcation pearls and stop at leaf pearls. This results in a graph whose nodes are pearls and whose edges define the connectivity between the pearls.

The iterative pearl generation can also check whether each new pearl contains an endpoint that was input by a user. Once an endpoint is reached, the current branch stops growing. After all endpoints have been found, the pearl generation is stopped, and all branches that do not end at an input end point can be trimmed away, leaving only the portions of the tubular structure desired by the user. This approach allows a user to isolate specific sections of the tubular structure prior to the segmentation, which can reduce the running time of the segmentation, as well as post-segmentation editing of the resulting model.

The initial seed $c_0$ is a point in the tubular structure at which the initial pearl is generated. The initial seed $c_0$ can be chosen to lie close to the centerline of the tubular structure and possibly at one end of the tubular structure. Based on the initial seed $c_0$, an iterative method is used to generate an ordered series of pearls, one at a time. During this iterative method, at each step, the center $c_i$ and radius $r_i$ of the current pearl is calculated so as to maximize $r_i$ subject to the image data, given the constraint that the distance $d_i$ between $c_i$ and the center $c_{i-1}$ of the previous pearl is bound by functions $d_{min}(r_{i-1},r_i)$ and $d_{max}(r_{i-1},r_i)$. The linear functions $d_{min,max}(r_{i-1},r_i) = ar_{i-1} + br_i$ can be used, with bounds $d_{min}(r_{i-1},r_i) = r_i/2$ and $d_{max}(r_{i-1},r_i) = r_{i-1} + r_i$ (when the latter bound is reached, the current pearl is tangent to the previous pearl). The advantage of the disclosed method accomplished by allowing $d_i$ to fluctuate, makes it possible to capture rapid changes in the thickness of the tubular structure.

Figure 3:
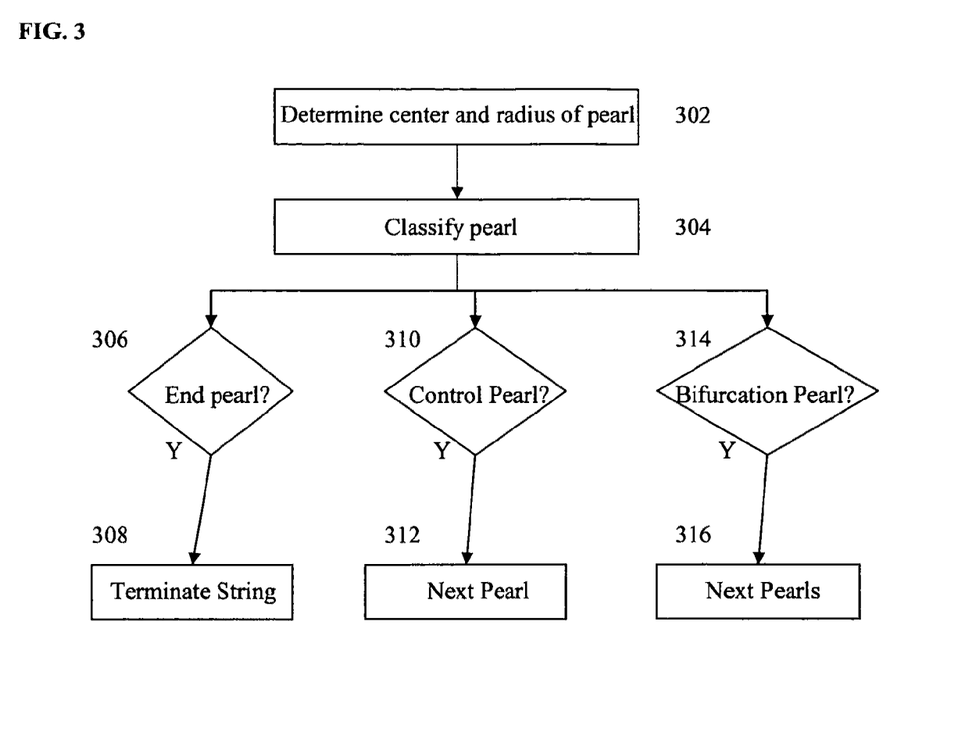
FIG. 3 illustrates method for generating a pearl according to an embodiment of the present invention.

FIG. 3 illustrates the method for generating a pearl according to an embodiment of the present invention. The method of FIG. 3 can be iteratively repeated to generate an ordered series of pearls in order to implement step 204 of FIG. 2. The method of FIG. 3 calculates a center $c_i$ and radius $r_i$ of a current pearl $P_i$, and the current pearl as an end pearl, control pearl, or bifurcation pearl. The current pearl $P_i$ is generated based on a previous pearl $P_{i-1}$ in the tubular structure starting with the seed pearl. As used herein, $c_{i-1}$ is the center of the previous pearl $P_{i-1}$, $c_i$ is the center of the current pearl $P_i$, and $r_i$ is the radius of the current pearl $P_i$.

At step 302, the center $c_i$ and radius $r_i$ of the current pearl are adjusted subject to a constraint on the distance between the current pearl $P_i$ and the previous pearl $P_{i-1}$. The values of $c_i$ and $r_i$ are adjusted to place the $i^{th}$ pearl in the tubular structure. In order to adjust the center $c_i$ and radius $r_i$ of a pearl, voxels inside the pearl are analyzed. Each voxel can impart a force on the pearl, and the forces of the voxels in a pearl are integrated and applied to the pearl to adjust the position (center) and radius of the pearl. The integration over all of the voxels in the pearl provides robustness to noise.

The overall goodness G of the current pearl $P_i$ can be expressed as the ratio of voxels in the pearl outside of the tubular structure (bad voxels) to the total voxels in the pearl, such that:

$$G = \frac{\int_{x \in P_i} \phi(x) dx}{\int_{x \in P_i} dx} \quad (2)$$

where x is a voxel center, and $$\phi(x) = \begin{cases} 1, & \text{if } \hat{p}_{out}(I(x)) > \hat{p}_{in}(I(x)) \\ 0, & \text{otherwise} \end{cases} \quad (3)$$

is an indicator function that equals one when a voxel's intensity has a higher probability of being outside of the tubular structure than being inside of the tubular structure.

In addition to the goodness G of the current pearl $P_i$, a weighted average F of the repelling forces acting on current pearl $P_i$ is also calculated as:

$$F(c_i, r_i) = \frac{9}{\pi r_i^3} \int_{x \in P_i} \phi(x)(c_i - x)\left(1 - \frac{\|c_i - x\|^2}{r_i^2}\right) dx \quad (4)$$

where $r_i$ is the radius of the center pearl $P_i$, and $c_i$ is the center of the current pearl $P_i$. The repelling force of a voxel within the pearl $P_i$ has a direction from the voxel towards the center of the pearl $P_i$ and has a magnitude that is proportional to the weight of the scalar field value at the voxel (probability that the voxel is outside of tubular structure) and the inverse of the squared distance from the voxel to the center of the pearl $P_i$. The function $F(c_i, r_i)$ sums the vectors $(c_i-x)$, where x is the vector coordinate of the current voxel, across the entire area of voxels for pearl $P_i$, using only those voxels such that $\phi(x)=1$, i.e., voxels determined to be outside the tubular structure. Each of these vectors is weighted by its distance from $c_i$, such that voxels nearer $c_i$ have a stronger influence on the result, as reflected in the $$\left(1 - \frac{\|c_i - x\|^2}{r_i^2}\right)$$

term. Accordingly, voxels that are closer to the center of the pearl apply more force to the pearl. Intuitively, Equation (4) states that each point inside the ith pearl but outside the tubular structure imparts a force on the pearl that pushes the pearl away from the tubular structure boundary. When the forces are all balanced on the pearl, the pearl can be centered in the center of the tubular structure.

The factor $$\frac{9}{\pi r^3}$$

is a normalization factor calculated based on the case where a pearl is intersected through its center by a plane, dividing the pearl into two equal good (voxels inside the tubular structure) and bad (voxels outside the tubular structure) regions. In this case, the factor $$\frac{9}{\pi r^3}$$

ensures that the magnitude of the offset is equal to $r_i$, which would move the pearl to be tangent to the intersecting plane and entirely in the good region. Determination of whether a voxel lies inside the tubular structure or outside of the tubular structure is achieved based on the first and second intensity probability densities $\hat{p}_{in}(I)$ and $\hat{p}_{out}(I)$ determined using non-parametric density estimation. A voxel having an intensity I is classified as outside of the tubular structure if $\hat{p}_{out}(I) > \hat{p}_{in}(I)$; otherwise it is classified as inside the tubular structure.

The center and the radius of the current pearl $P_i$ are determined by iteratively adjusting the radius towards a prescribed target goodness, $G_{target}$, and iteratively displacing the pearl according to F. The displacement is capped based on a distance constraint so that the pearl $P_i$ remains sufficiently close to the center of the previous pearl $P_i$. A distance constraint can be enforced on the pearl center such that the distance $d_i$ between $c_i$ and the center $c_{i-1}$ of the previous pearl is bounded by functions $d_{min}(r_{i-1}, r_i)$ and $d_{max}(r_{i-1}, r_i)$, as described above. The center position and radius are iteratively adjusted until G for the pearl is sufficiently close to $G_{target}$. According to a possible implementation, $G_{target}$ can be selected to be 25% (i.e., a target pearl will have 25% of its voxels with a high probability of being outside the tubular structure).

At step 304, the current pearl is classified an end pearl, a control pearl, or a bifurcation pearl. In order to classify the pearl, it is first determined whether the pearl contains a specified endpoint. If the pearl contains an endpoint, it is classified as an end pearl. Otherwise, a set of rays emanating in a normal direction from uniform samples on the pearl's surface are used to sample the indicator function. Let v be a sampling point on the pearl's surface. The indicator function along the segment $c_i + r_i t(v - c_i)$ is sampled, where $t \in [1, 2]$. A segment is classified as good if all of its samples lie in the good region (inside the tubular structure); otherwise, the segment is classified as bad. Next, the connected components of the samples v on good segments are identified, and for each connected component, a "center" of the connected component is identified as the average of the average of the samples v corresponding to the segments within the component. To prevent backtracking, the connected component that is closest to the previous pearl is discarded. If the current pearl has no remaining connected components, the pearl is an end pearl (306). If the current pearl, has one remaining connected component, the pearl is a control pearl (310). If the current pearl has two or more remaining connected components, the pearl is a bifurcation pearl (314). In addition to detected connected components of good voxels, sphere-intersection tests can be performed to detect cycles or loops. If an intersection is found between the current pearl and another pearl that are not directly connected, the current pearl can be classified as a bifurcation pearl.

If the current pearl is an end pearl (306), at step 308, the string of pearls is terminated at the current pearl. If the current pearl is a control pearl (310), at step 312, the method proceeds to a next pearl in the string in the direction of the remaining connected component. In this case, the center of the connected component of good voxels can be used as the initial center point for the next pearl. If the current pearl is a bifurcation pearl (314), at step 316, the method proceeds to next pearls in the direction of each remaining connect component. In this case, the center of each remaining connected component of good voxels can be used as the initial center point for each of the next pearls. Accordingly, each next pearl that is generated is the beginning of a different string or branch that diverges from the bifurcation pearl.

By repeating the method of FIG. 3, it is possible to segment the tubular structure in the 3D image by generating a tree having branches each made up of a string of pearls. Image (d) of FIG. 1 illustrates a tree that is an exemplary segmentation result of a 3D tubular structure generated using pearling. As illustrated in image (d) of FIG. 1, pearl 110 is the seed pearl, pearls 112 are bifurcation pearls, pearls, 114 are control pearls, and pearls 116 are end pearls.

Once the tubular structure in the 3D image is segmented using pearling and a tree is generated representing the tubular structure, the tree can be interactively edited. Returning to FIG. 2, at step 206, the strings of pearls generated at step 204 are displayed. For example, tree resulting from the pearling segmentation can be displayed by a display of a computer system.

At step 208, the strings of pearls are edited based on user input. In order to edit the strings of pearls, any pearl can be selected by a user, for example using a mouse click. Through a key-press and mouse click combination, the user may trim a portion of the tree starting at the selected pearl. Accordingly, undesired branches can be easily removed from the segmented tree. Image (e) of FIG. 1, shows the tree of image (d) with undesired branches removed.

The user can toggle between viewing the tree and any of the axis-aligned cross sections of the 3D image. Image (f) of FIG. 1 shows such an axis-aligned cross-section 118. The pearls that are generated to segment the tubular structure can be seen in the axis-aligned cross-section 118. As illustrated in image (f) the cross-section 118 reveals a missing branch 120 that was not segmented. As illustrated image (g) of FIG. 1, the user can click and drag on the cross-section to indicate a position 122 and direction 124 of a new growth process for segmenting the missing branch 120. This branch is segmented using pearling as described above. As illustrated in image (h) of FIG. 1, the new strings of pearls (branches) 126 are added to the tree and displayed. Small unwanted branches produced by this new growth may be easily removed in response to user input. Image (i) of FIG. 1 shows the tree of image (h) with undesired branches removed.

Returning to FIG. 2, at step 210, the segmented tubular structure can be refined to generate a continuous model. Pearling generates runs of control pearls, which can be used as control points of a curve in a four dimensional space of the (x,y,z,r) coordinates defining the center location and the radius of the pearls. This control polygon defines a continuous (piecewise-cubic) model of each branch, which for example may be approximated by iterating four-point refinements or defined by a series of Bezier curves using a Catmull-Rom spline formulation. The tubular structure can be encoded as a set of nodes and runs. Each node has an integer ID (i.e., identifier) and is associated with a seed, leaf (end), or bifurcation pearl. Each edge knows the two IDs of its node pearls (which serve as the two end control pearls), which have an ordered set of control pearls between them. The set of control pearls generated by pearling along each tube may not be dense enough for rendering or other applications. According to one possible implementation, an iterative subdivision process can be used to refine the strings of pearls, where at each iteration, a new pearl is inserted between each pair of consecutive pearls. Hence, at each iteration the number of pearls roughly doubles. As the iterations are repeated, the series converges to a smooth curve in the four dimensional space of (x,y,z,r). This iterative subdivision process can use a four-point subdivision rule to interpolate the radius and center points of the pearls in order to generate the (x,y,z,r) data for the newly generated pearls. Image (j) of FIG. 1 shows the tree of image (i) after one refinement step (i.e., one iteration of the subdivision process), and image (k) of FIG. 1 shows the tree of image (i) after five refinement steps.

Another possible implementation for refining the strings of pearls uses the Catmull-Rom spline, which constructs the final curve directly as a series of short curves, each one being defined by a parametric cubic function. Although the iterative subdivision and Catmull-Rom spline techniques are described for refining the pearl strings to generate a continuous model, the present invention is not limited thereto, and a variety of other techniques can be used as well.

The continuous model generated at step 210 can be output as the segmentation result representing the tubular structure. The continuous model can be output by being displayed by a display of a computer system performing the segmentation method. The image of the continuous model can be printed. It is also possible that the control model produced by pearling or the continuous model derived from it be stored in memory or storage of a computer system, used by other computer programs, or transferred to another computer. The continuous model can be output by interactive image segmentation software running on a computer system.

Figure 4:
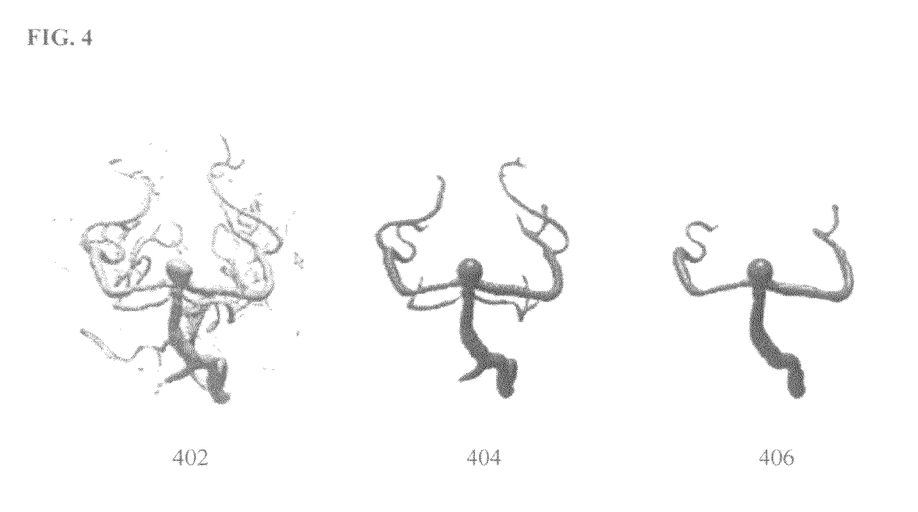
FIG. 4 illustrates exemplary segmentation results of a rotational angiography scan of a head with an aneurysm.

FIG. 4 illustrates exemplary segmentation results of a rotational angiography scan of a head with an aneurysm. Image 402 shows a thresholded volume rendering of the original angiography dataset. Image 404 shows an initial segmentation result using the pearling method described above. The segmentation result of image 404 contains 328 pearls and was generated in 1.1 seconds. Image 406 shows the segmentation result of image 404 after being edited in response to user inputs. The goal of the editing was to trim everything away except the main vessel, the aneurysm, and the two major branches leading from that junction. This interaction took approximately 30 seconds and involved nine deletions.

Figure 5:
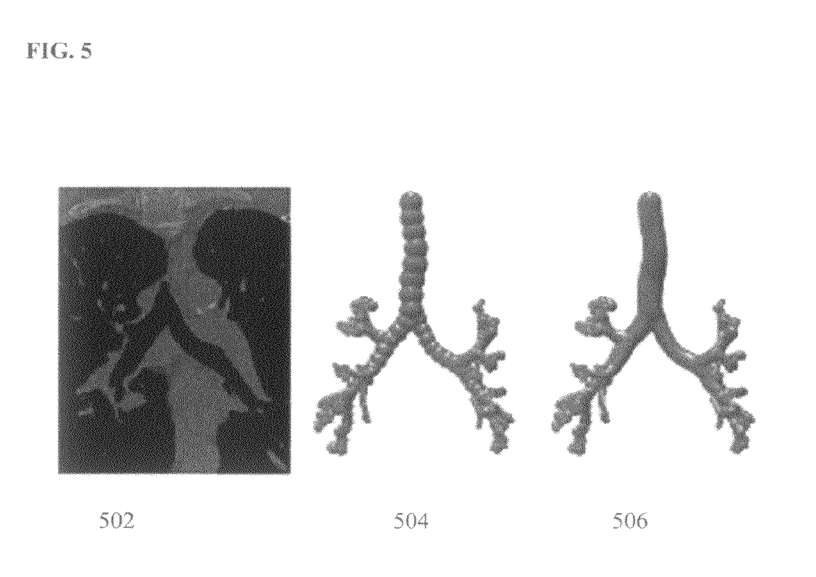
FIG. 5 illustrates exemplary segmentation results of a CT scan of the bronchial tubes and lungs.

FIG. 5 illustrates exemplary segmentation results of a CT scan of the bronchial tubes and lungs. Image 502 shows a slice of the chest CT scan. Image 504 shows an initial segmentation result of the CT volume using the pearling method described above. The segmentation result in image 504 contains 638 pearls and was generated in 1.5 seconds. Image 506 shows a continuous model resulting from refinement of the segmentation result in image 504.

Figure 6:
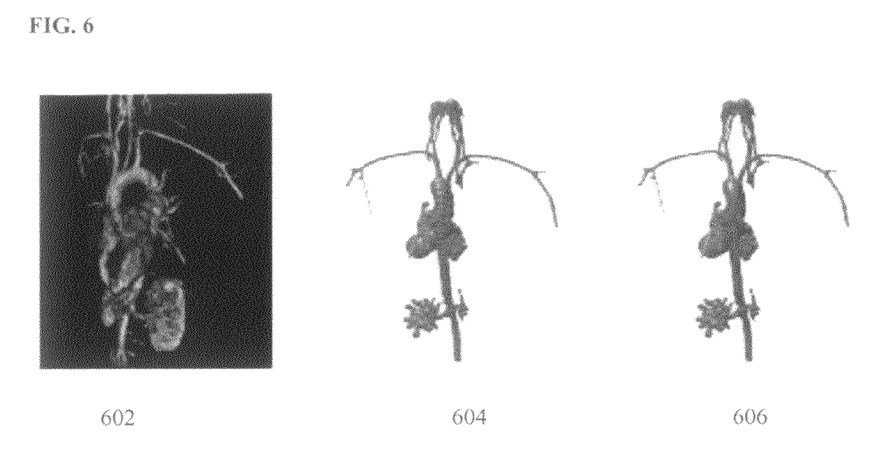
FIG. 6 illustrates exemplary segmentation results of a contrast enhanced MRA of pulmonary arteries.

FIG. 6 illustrates exemplary segmentation results of a contrast enhanced MRA of pulmonary arteries. This shows the pearling method segmenting a detailed dataset. Image 602 shows a volume rendering of the contrast enhanced MRA dataset. Image 604 shows an initial segmentation result of the contrast enhanced MRA dataset using the pearling method described above. The segmentation result in image 604 contains 10,186 pearls and was generated in 67 seconds. Image 606 shows a continuous model resulting from refinement of the segmentation result in image 604. As illustrated in image 606, the refinement results in smooth tubular structures.

Figure 7:
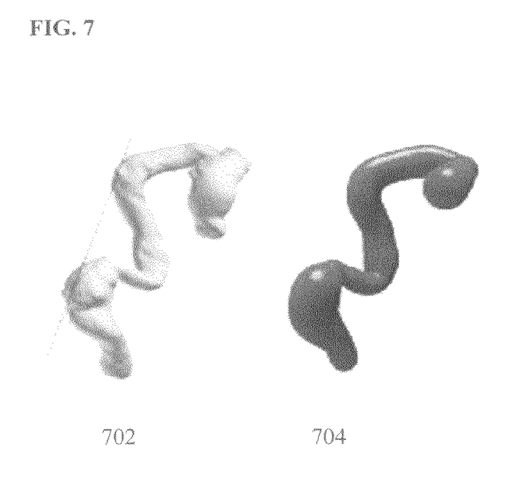
FIG. 7 illustrates exemplary segmentation results of the aorta in the MRA dataset of FIG. 6.

In a complex example, such as the MRA dataset of FIG. 6, if the user only needs to examine a subset of the image, an endpoint can be used to explicitly stop the pearling method. FIG. 7 illustrates exemplary segmentation results of the aorta in the MRA dataset of FIG. 6. Image 702 shows an aorta segmentation obtained using level set methods. The aorta segmentation of image 702 required 10 minutes of execution time on a reduced volume of size 256×256×229. This reduced volume was used because the full size volume combined with the temporary structures necessary for the level set method was too large for the test machine. Image 704 shows a segmentation result of the aorta using the pearling method described above with an endpoint prescribed by a user. No final trimming was need for the result of image 704, and the execution took 1.5 seconds on the raw 512×512×459 volume. Accordingly, it can be noted that the result generated using the pearling method of the present invention is generated in over two orders of magnitude less time than the result generated using the level set method.

Figure 8:
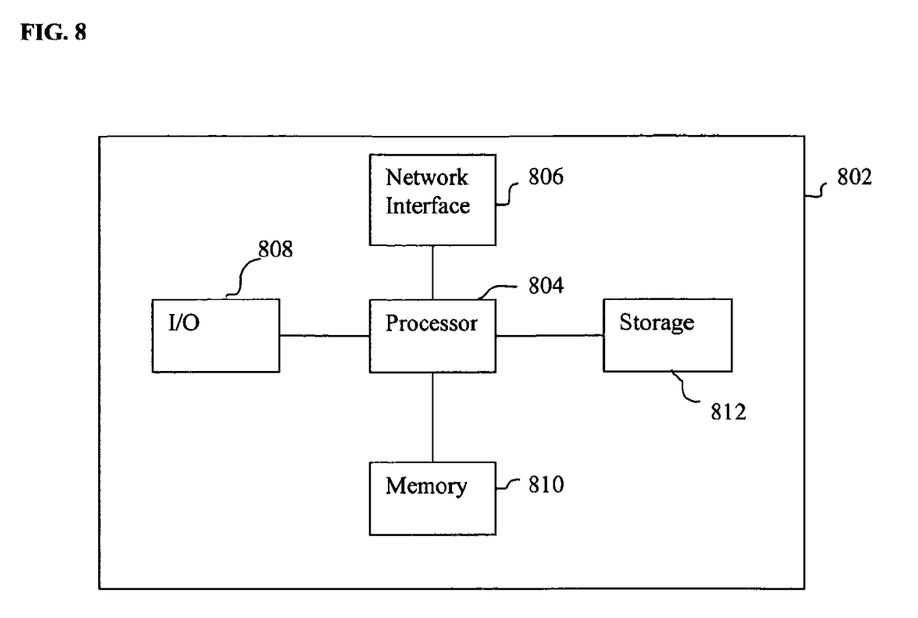
FIG. 8 is a high level block diagram of a computer capable of implementing the present invention.

The above-described method steps of FIGS. 2 and 3 for segmenting tubular structures in a 3D image may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812 (e.g., magnetic disk) and loaded into memory 810 when execution of the computer program instructions is desired. Thus, an application for segmenting tubular structures in 3D images may be defined by the computer program instructions stored in the memory 810 and/or storage 812 and controlled by the processor 804 executing the computer program instructions. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for segmenting a tubular structure in a 3D image, comprising:
   generating, by a processor, an ordered series of pearls along the tubular structure, wherein each pearl is a sphere having parameters of a center location and radius, and wherein said step of generating an ordered series of pearls comprises, for each pearl:
   (a) adjusting the center location of the pearl based on voxels that are in the pearl and classified as outside of the tubular structure; and
   (b) adjusting the radius of the pearl based on a ratio of voxels in the pearl and classified as outside the tubular structure to total voxels in the pearl.

2. The method of claim 1, further comprising:
   generating a continuous model of the tubular structure using the center locations and the radii of the ordered series of pearls.

3. The method of claim 1, further comprising:
   receiving user inputs identifying a first region in said 3D image inside of the tubular structure and a second region in said 3D image outside of the tubular structure; and
   estimating a classification function that classifies a voxel in said 3D image as inside or outside of the tubular structure being segmented, based on the first and second regions, respectively.

4. The method of claim 1, wherein said step of generating an ordered series of pearls further comprises, for each pearl:
   (c) repeating steps (a) and (b) until the center location and the radius of the pearl converge.

5. The method of claim 4, wherein steps (a) and (b) are performed subject to constraints on a distance between the center of a current pearl and the center of a previous pearl, where the constraints are defined at least in terms of the respective radii of the current and previous pearls.

6. The method of claim 4, wherein said step of generating an ordered series of pearls further comprises, for each pearl:
   (d) classifying the pearl as one of an end pearl, a control pearl, and a bifurcation pearl.

7. The method of claim 6, wherein step (d) comprises:
   detecting whether the pearl contains a user input endpoint;
   if the pearl contains a user input endpoint, classifying the pearl as an end pearl.

8. The method of claim 6, wherein step (d) comprises:
   detecting connected components of voxels classified as in the tubular structure in a region surrounding the pearl;
   discarding a detected connected component that is closest to a previous pearl;
   if the number of remaining connected components detected is zero, classifying the pearl as an end pearl;
   if the number of remaining connected components detected is one, classifying the pearl as a control pearl; and
   if the number of remaining connected components detected is greater than one, classifying the pearl as a bifurcation pearl.

9. The method of claim 8, wherein said step of generating an ordered series of pearls further comprises, for each pearl:
   (e) if the pearl is classified as an end pearl, terminating said ordered series of pearls;
   (f) if the pearl is classified as a control pearl, determining a center location of the remaining connected components and initializing a next pearl at the center location; and (g) if the pearl is classified as a bifurcation pearl, determining center locations for the remaining connected components and initializing a next pearl at each of the center locations.

10. The method of claim 1, wherein said step of generating an ordered series of pearls comprises:

receiving an initial seed point and direction; and sequentially generating pearls starting at said initial seed point and moving in said direction along the tubular structure by iteratively repeating steps (a) and (b) for each pearl to estimate the center location and radius for each pearl to fit each pearl to the tubular structure.

11. The method of claim 1, wherein said step of generating an ordered series of pearls comprises:

receiving a user input indicating an endpoint; and sequentially generating pearls along the tubular structure by iteratively repeating steps (a) and (b) for each pearl to estimate the center location and radius for each pearl to fit each pearl to the tubular structure, until said endpoint is reached.

12. The method of claim 1, further comprising:

displaying the ordered series of pearls representing the tubular structure; and receiving a user input in response to displaying the ordered series of pearls representing the tubular structure.

13. The method of claim 12, further comprising:

deleting a branch of the tubular structure modeled by the ordered series of pearls in response to receiving said user input.

14. The method of claim 12, further comprising:

initiating an ordered series of pearl at a branch of the tubular structure not yet modeled by the ordered series of pearls in response to receiving said user input.

15. An apparatus for segmenting a tubular structure in a 3D image, comprising:

means for generating an ordered series of pearls along the tubular structure, wherein each pearl is a 3D sphere having parameters of a center location and radius, and wherein said means for generating an ordered series of pearls comprises:

means for iteratively adjusting the center location of each pearl based on voxels that are in that pearl and outside of the tubular structure; and means for iteratively adjusting the radius of each pearl based on a ratio of voxels in the pearl and outside the tubular structure to total voxels in the pearl.

16. The apparatus of claim 15, further comprising:

means for generating a continuous model of the tubular structure using the center locations and the radii of the ordered series of pearls.

17. The apparatus of claim 15, wherein said means for generating an ordered series of pearls further comprises:

means for classifying each voxel in each pearl as inside or outside of the tubular structure; and means for determining whether the center location and radius of each pearl have converged.

18. The apparatus of claim 15, wherein said means for generating an ordered series of pearls further comprises:

means for classifying each pearl as one of an end pearl, a control pearl, and a bifurcation pearl.

19. The apparatus of claim 15, wherein said means for generating an ordered series of pearls comprises:

means for receiving an initial seed point and direction; and means for sequentially generating pearls starting at said initial seed point and moving in said direction along the tubular structure by iteratively estimating the center location and radius for each pearl to fit each pearl to the tubular structure.

20. The apparatus of claim 15, wherein said means for generating an ordered series of pearls comprises:

means for receiving a user input indicating an endpoint; and means for sequentially generating pearls along the tubular structure by iteratively estimating the center location and radius for each pearl to fit each pearl to the tubular structure, until said endpoint is reached.

21. The apparatus of claim 15, further comprising:

means for displaying the ordered series of pearls representing the tubular structure;

means for receiving a user input in response to displaying the ordered series of pearls representing the tubular structure; and means for editing the ordered series of pearls in response to receiving a user input.

22. A non-transitory computer readable medium encoded with computer executable instructions for segmenting a tubular structure in a 3D image, the computer executable instructions defining a step comprising:

generating an ordered series of pearls along the tubular structure, wherein each pearl is a 3D sphere having parameters of a center location and radius, wherein the step of generating an ordered series of pearls comprises, for each pearl:

(a) adjusting the center location of the pearl based voxels that are in the pearl and classified as outside of the tubular structure; and (b) adjusting the radius of the pearl based on a ratio of voxels in the pearl and classified as outside the tubular structure to total voxels in the pearl.

23. The non-transitory computer readable medium of claim 22, wherein the step of generating an ordered series of pearls further comprises, for each pearl:

(c) repeating steps (a) and (b) until the center location and the radius of the pearl converge.

24. The non-transitory computer readable medium of claim 22, wherein the step of generating an ordered series of pearls further comprises, for each pearl:

(d) classifying the pearl as one of an end pearl, a control pearl, and a bifurcation pearl.

25. The non-transitory computer readable medium of claim 22, further comprising computer executable instructions defining the steps of:

displaying the ordered series of pearls representing the tubular structure;

editing the ordered series of pearls in response to user input.

* * * * *